G. C. BRACKETT.
DUST COLLECTOR FOR ROCK DRILLS.
APPLICATION FILED AUG. 9, 1915.
1,223,027.
Patented Apr. 17, 1917.
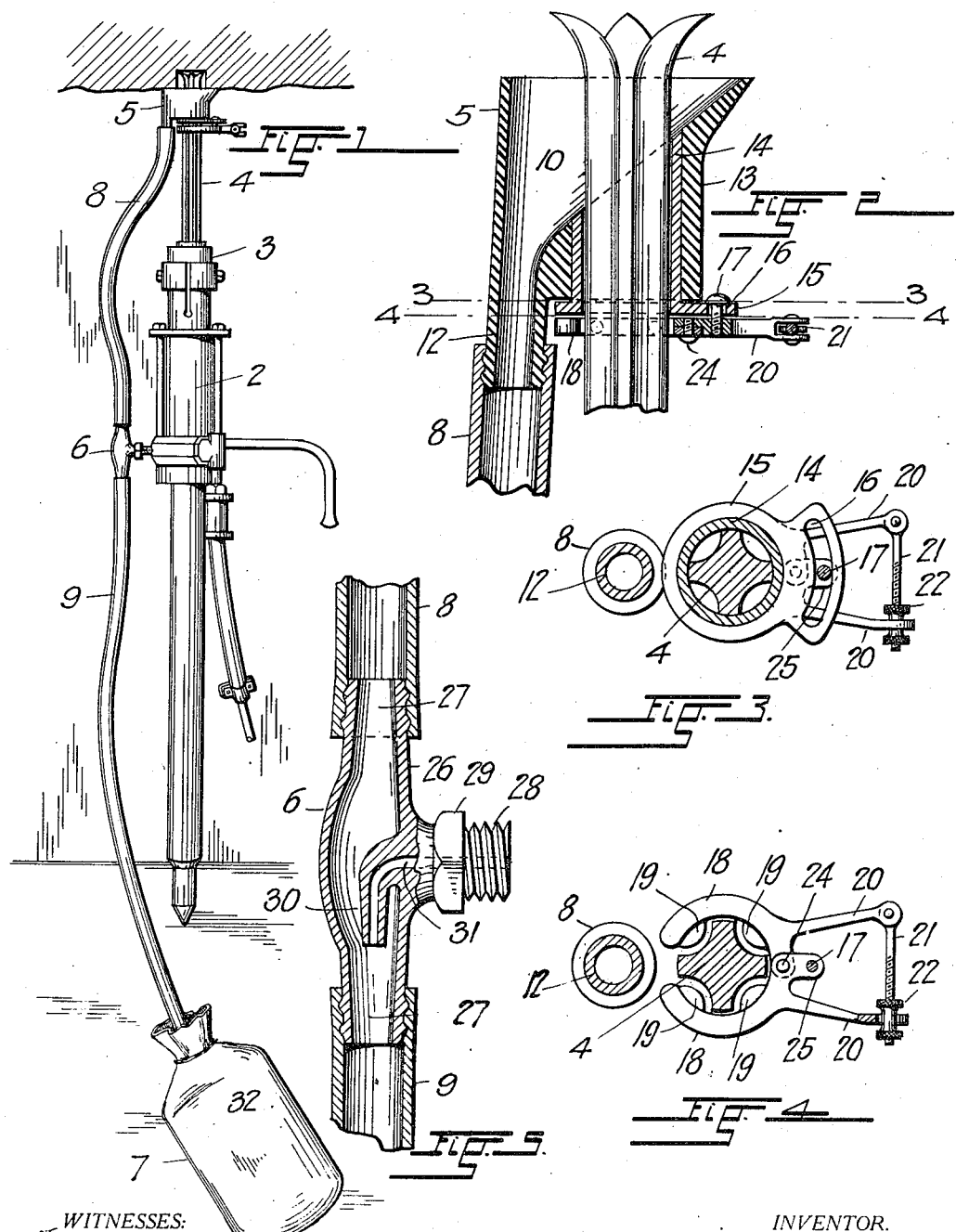
WITNESSES:
INVENTOR.
G. C. Brackett.
BY
ATTORNEY.

UNITED STATES PATENT OFFICE.

GEORGE C. BRACKETT, OF DENVER, COLORADO, ASSIGNOR OF ONE-HALF TO GEORGE N. ROBINSON, OF DENVER, COLORADO.

DUST-COLLECTOR FOR ROCK-DRILLS.

1,223,027. Specification of Letters Patent. Patented Apr. 17, 1917.

Application filed August 9, 1915. Serial No. 44,481.

*To all whom it may concern:*

Be it known that I, GEORGE C. BRACKETT, a citizen of the United States, residing at Denver, in the county of Denver and State of Colorado, have invented certain new and useful Improvements in Dust-Collectors for Rock-Drills, of which the following is a specification.

This invention relates to improvements in dust collectors of the type used in connection with rock-drills to receive and convey to a suitable receptacle the cuttings produced by the action of the drill-steel upon the rock.

The primary purpose of collectors of this character is to protect the operator of a rock drill against annoyance and injury by the ejected dust and chips, and it is to this end the principal object of my invention to provide in a device of the character mentioned, a receiving member which is mounted upon the drill-steel to engage the surface of the rock around the drill hole produced thereby and to receive and convey to a suitable receptacle most of the dust and cuttings produced in the drilling action.

Another object of my invention is to provide a dust collector of the described type which can be used in conjunction with a solid drill-steel and does not depend for its effective operation upon a passage or passages in the steel, and further objects of the invention reside in providing a dust collector the operation of which is effected in a novel manner by compressed air obtained from the pneumatic drill upon which it is installed.

With the above and other objects in view, all of which will fully appear in the course of the following description, my improved dust collector for rock drills consists of mechanism of the character shown and described in the accompanying drawings in the various views of which like parts are similarly designated, and in which, Figure 1 is an elevation of a rock drill in its operative position, to which my invention is applied, Fig. 2, an enlarged sectional view of the receiving member of the invention in connection with a drill steel upon which it is mounted, Fig. 3, a transverse section along the line 3—3, Fig. 2, Fig. 4, a similar section taken along the line 4—4, Fig. 2, and Fig. 5, an enlarged longitudinal section through the ejector-member of the device, which connects with an air-supply-opening of the rock drill.

Referring more specifically to the drawings, the reference numeral 2 designates a pneumatic rock-drill of ordinary construction which in a chuck 3 at its forward end, carries the longitudinally fluted drill-steel 4.

The rock-drill has been shown in the drawings in the position it occupies in drilling overhead holes, it being an advantage of my invention that its practical operation is not affected by the position of the rock-drill to which it is applied.

My improved dust-collector as shown in the drawings consists of a receiving member 5, an ejector-member 6 and a collecting member 7 which are connected by flexible tubes 8 and 9.

The receiving member consists of an internally funnel-shaped cup 10 preferably made of rubber or other flexible material, which terminates at its rearward end in a tubular, externally ribbed nipple 12 for the attachment of the before-mentioned tube 8.

A sleeve 13 formed integrally with and exteriorly of the wall of the cup at a side of the nipple 12, provides a box for the application of a metal bushing 14 which fits slidably around the drill-steel 4.

The bushing has at its rearward end a flange 15 which engages the corresponding end of the box and which in a laterally projecting portion has a segmental slot 16 to receive a screw 17 forming part of a clamp by means of which the cup is operatively secured upon the drill-steel.

The clamp consists of a pair of tongues pivoted as at 24 and provided with curved jaws 18 to embrace the steel as shown in Fig. 4.

The jaws have interiorly a plurality of protuberances 19 which when the clamp is applied around the drill steel in the manner shown, enter the longitudinal flutes of the same and thereby hold the clamp against rotation on the steel.

Pivoted at the extremity of one of the arms 20 of the tongues is a bolt 21 carrying a nut 22 which normally extends through a slot in the end of the other arm. By screwing this nut upon the threaded end of the bolt the jaws of the tongues are drawn around the drill-steel to frictionally slidably engage the same.

The hereinbefore mentioned screw 17 which extends loosely through the segmental slot in the flange of the bushing, is screwed into a threaded aperture in a lateral lug 25 on one of the members of the clamp, its function being to secure the bushing to the clamp while permitting of a limited oscillating-rotary movement of the drill-steel to which the device is applied, without disturbing the position of the bushing through which the steel extends.

The ejector member of the invention consists of a coupling 26 provided at its opposite ends with axially alined externally ribbed nipples 27 for the attachment of the ends of the tubes 8 and 9 and at an intermediate point with a laterally projecting screw 28 for its connection with the correspondingly threaded air-supply opening of the drill-housing.

The shank of the screw is enlarged and made of angular form to provide a head 29 which limits the inward movement of the screw and allows of the application of a wrench for the adjustment of the member.

A nozzle 30 formed integrally with the coupling extends longitudinally, rearwardly within the same in connection with an axial bore 31 of the laterally extending screw.

The collecting member of the device is preferably composed of a bag 32 of suitable construction and size the mouth of which is drawn tightly around the end of the tube 9 opposite to that at which it connects with the ejector member.

In operation, the receiving member is in the manner hereinbefore described, mounted upon the drill-steel so that the outer edge of the cup 10 engages the rock around the drill-hole, while the bit of the drill-steel strikes the breast of the same.

The flexibility of the material of which the cup is composed insures its close contact with the rock so that most of the dust and chips produced by the impact of the drill-steel upon the rock will enter the receiving member.

The compressed air obtained from the drill-housing is ejected through the nozzle 30 in the ejector-member thereby creating a partial vacuum which draws the cuttings from the receiver member through the tubes 8 and 9 and the connecting coupling 26 into the collecting member 7 which is placed in suitable proximity to the drill.

During the oscillatory movement imparted to the drill-steel in the operation of the rock-drill, the screw 17 on the clamp which rotates with the steel, travels back and forth in the segmental slot 16 of the bushing, and the cup 10 remains in consequence in its proper position to engage the rock around the drill-hole.

As the drill-steel advances into the hole, the receiving member is by impact with the rock, moved rearwardly along the steel, it being understood that the frictional engagement of the clamp with the steel holds the member against accidental or undue and excessive displacement.

Having thus described my invention what I claim and desire to secure by Letters-Patent is:

1. The combination with a drill-steel mounted to move longitudinally and to rotate about its longitudinal axis, of a dust-collector comprising a cup-member adapted to engage the rock around a drill-hole during action of the steel upon the breast thereof, and having a bore in which said drill steel is loosely fitted, and a slot concentric with said bore, a clamping-member nonrotatably mounted upon the steel and adapted to slide longitudinally with relation thereto, and a pin on said clamping-member extending loosely through the slot of the cup-member.

2. The combination with a drill-steel mounted to move longitudinally and to rotate about its longitudinal axis, of a dust-collector comprising a cup-member adapted to engage the rock around a drill-hole during action of the steel upon the breast thereof, and having a bore in which said drill-steel is loosely fitted, a clamping member nonrotatably mounted upon the steel and adapted to slide longitudinally with relation thereto, and a connection between said clamping member and said cup-member which permits of free rotary movement of the one with relation to the other.

In testimony whereof I have affixed my signature in presence of two witnesses.

GEORGE C. BRACKETT.

Witnesses:
G. J. ROLLANDET,
L. RHOADES.